United States Patent [19]

Nagura et al.

[11] Patent Number: 5,095,704
[45] Date of Patent: Mar. 17, 1992

[54] TURBOCHARGED ENGINE

[75] Inventors: Takahiro Nagura; Kazutoshi Suzuki, both of Iwata, Japan

[73] Assignee: Yamaha Hatsudoki Kabushiki Kaisha, Iwata, Japan

[21] Appl. No.: 628,491

[22] Filed: Dec. 17, 1990

Related U.S. Application Data

[62] Division of Ser. No. 295,483, Jan. 10, 1989, Pat. No. 4,993,227.

[30] Foreign Application Priority Data

Jan. 11, 1988 [JP] Japan ................................ 63-2416

[51] Int. Cl.⁵ .............................................. F02B 37/00
[52] U.S. Cl. ...................................................... 60/612
[58] Field of Search ............... 60/280, 323, 597, 605.1, 60/612; 123/41.82 R

[56] References Cited

U.S. PATENT DOCUMENTS

| | | | |
|---|---|---|---|
| 2,257,631 | 9/1941 | Wahlberg | 60/323 X |
| 3,948,052 | 4/1976 | Merkle et al. | 60/605.1 |
| 4,086,763 | 5/1978 | Matsushita et al. | 60/323 X |
| 4,329,843 | 5/1982 | Inoue et al. | 62/323 X |
| 4,464,902 | 8/1984 | Mendle et al. | 60/612 |
| 4,658,763 | 4/1987 | Gobien et al. | 123/41.82 R |

FOREIGN PATENT DOCUMENTS

| | | | |
|---|---|---|---|
| 2021600 | 11/1971 | Fed. Rep. of Germany | 60/280 |
| 24417 | 2/1982 | Japan | 60/612 |
| 185932 | 10/1983 | Japan . | |
| 781381 | 11/1980 | U.S.S.R. | 60/597 |
| 352912 | 1/1930 | United Kingdom | 60/323 |

*Primary Examiner*—Michael Koczo
*Attorney, Agent, or Firm*—Ernest A. Beutler

[57] ABSTRACT

A turbo-charged internal combustion engine having the cylinders communicating with exhaust passages that merge into common outlets that are disposed midway between the exhaust passages and which lie in a common plane. A cooling jacket encircles these exhaust passages and is divided by a wall into upper and lower portions.

6 Claims, 8 Drawing Sheets

TURBOCHARGED ENGINE

This is a division of U.S. patent application Ser. No. 295,483, filed Jan. 10, 1989, now U.S. Pat. No. 4,993,227.

BACKGROUND OF THE INVENTION

This invention relates to a turbo-charged engine and more particularly to an improved manifolding system for delivering exhaust gases from the combustion chambers to the turbine stage of the turbo-charger.

The use of turbo-chargers for internal combustion engines is well known. A turbo-charger has the advantage in that it is driven by the exhaust gases of the engine and thus reclaims energy which might be otherwise lost. However, one of the disadvantages of a turbo-charger is the so-called "turbo lag" that results from the fact that the exhaust pressure does not increase as rapidly as the load on the engine under acceleration conditions.

In order to reduce turbo lag, a wide variety of devices and methods have been employed. Specifically, it is known that the positioning of the turbine stage inlet as close as possible to the exhaust ports of the engine will have the result of reducing turbo lag. However, by placing the turbine stage in direct communication with the exhaust port and close to it, some of the advantages of exhaust port tuning are lost and power can be deteriorated under some running conditions. In addition, if the exhaust passage is short and the turbine stage of the turbo-charger is mounted directly to the engine, primarily the cylinder head where the exhaust port is normally formed, the heat from the turbine stage can be transmitted to the engine and cause loss of performance and/or possible deformation of the engine components. Also, when multiple cylinders are employed, it is desirable to operate the turbo-charger in such a way that the individual exhaust passages will have substantially the same length and equal flow from them to the turbine stage.

It is, therefore, a principal object of the invention to provide an improved, turbo-charged internal combustion engine.

It is a further object of this invention to provide a construction for turbo-charging an engine wherein optimum length exhaust passages can be employed without introducing turbo lag and without unduly heating the cylinder head of the engine.

It is a yet further object of this invention to provide an improved arrangement for operating a turbo-charger from an internal combustion engine with minimum lag and minimum heat distortion for the cylinder head.

SUMMARY OF THE INVENTION

This invention is adapted to be embodied in a turbo-charger arrangement for an internal combustion engine having a plurality of combustion chambers. A plurality of exhaust ports are provided for discharging the exhaust gases from the combustion chambers through respective exhaust passages which extend in substantially a common plane from the respective exhaust ports to a common exhaust gas outlet which lies within the plane. The exhaust gas outlet is positioned substantially at the midpoint within the plane between the exhaust ports for maintaining substantially equal lengths for the exhaust passages and a relatively short length therefor. A turbo-charger is employed that has a turbine inlet stage which is in direct communication with the exhaust gas outlet.

DETAILED DESCRIPTION OF THE PREFERRED EMBODIMENTS

Embodiment of FIGS. 1 Through 9

Figure 1:
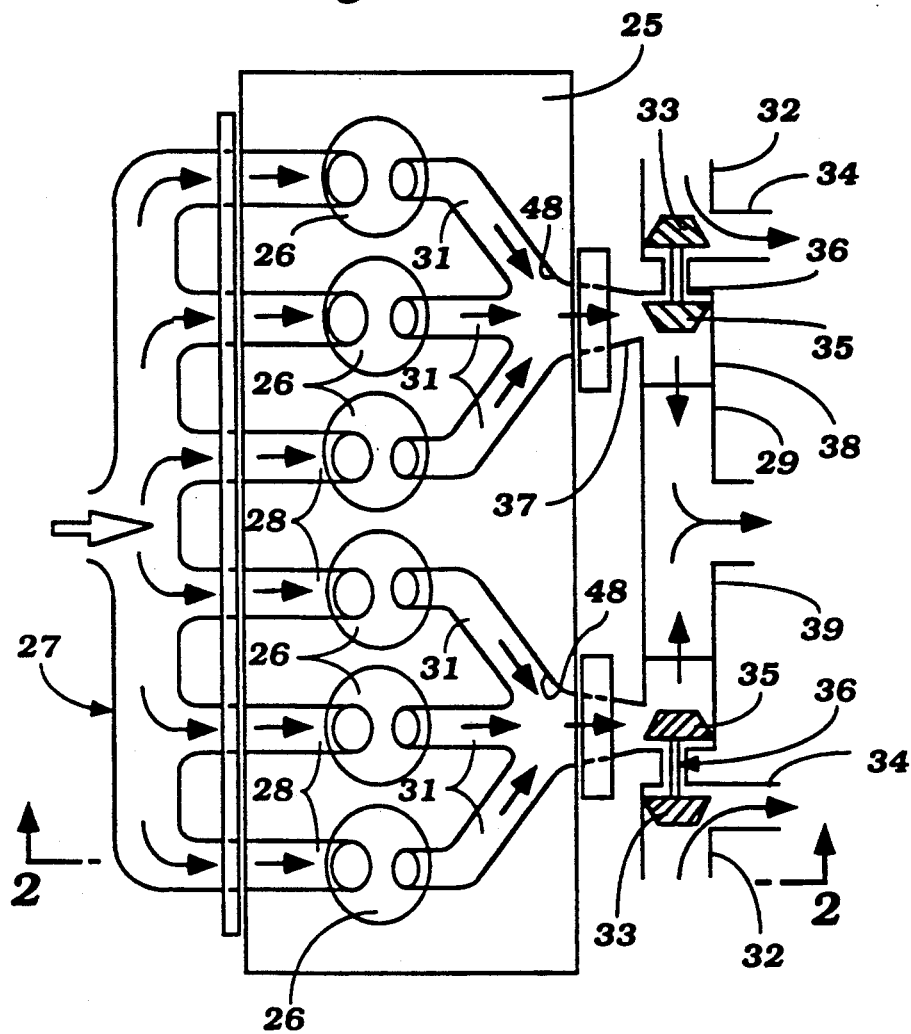
FIG. 1 is a partially schematic top plan view of an internal combustion engine constructed in accordance with a first embodiment of the invention.
Figure 2:
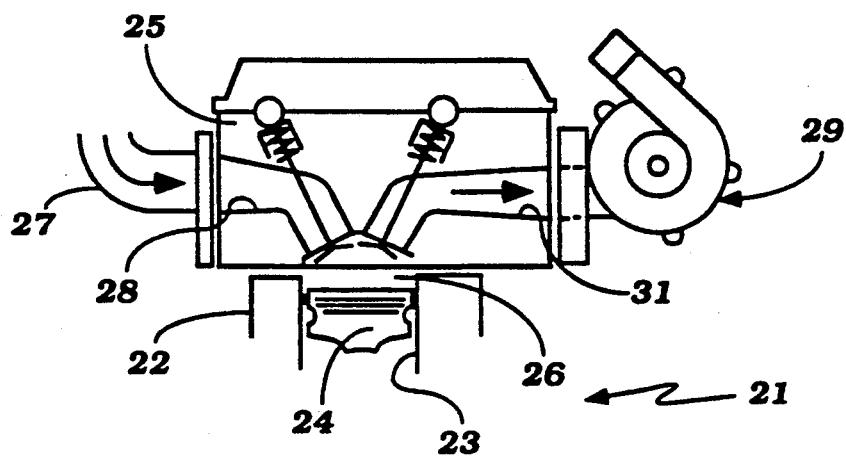
FIG. 2 is a partially schematic cross sectional view taken along the line 2—2 of FIG. 1.
Figure 3:
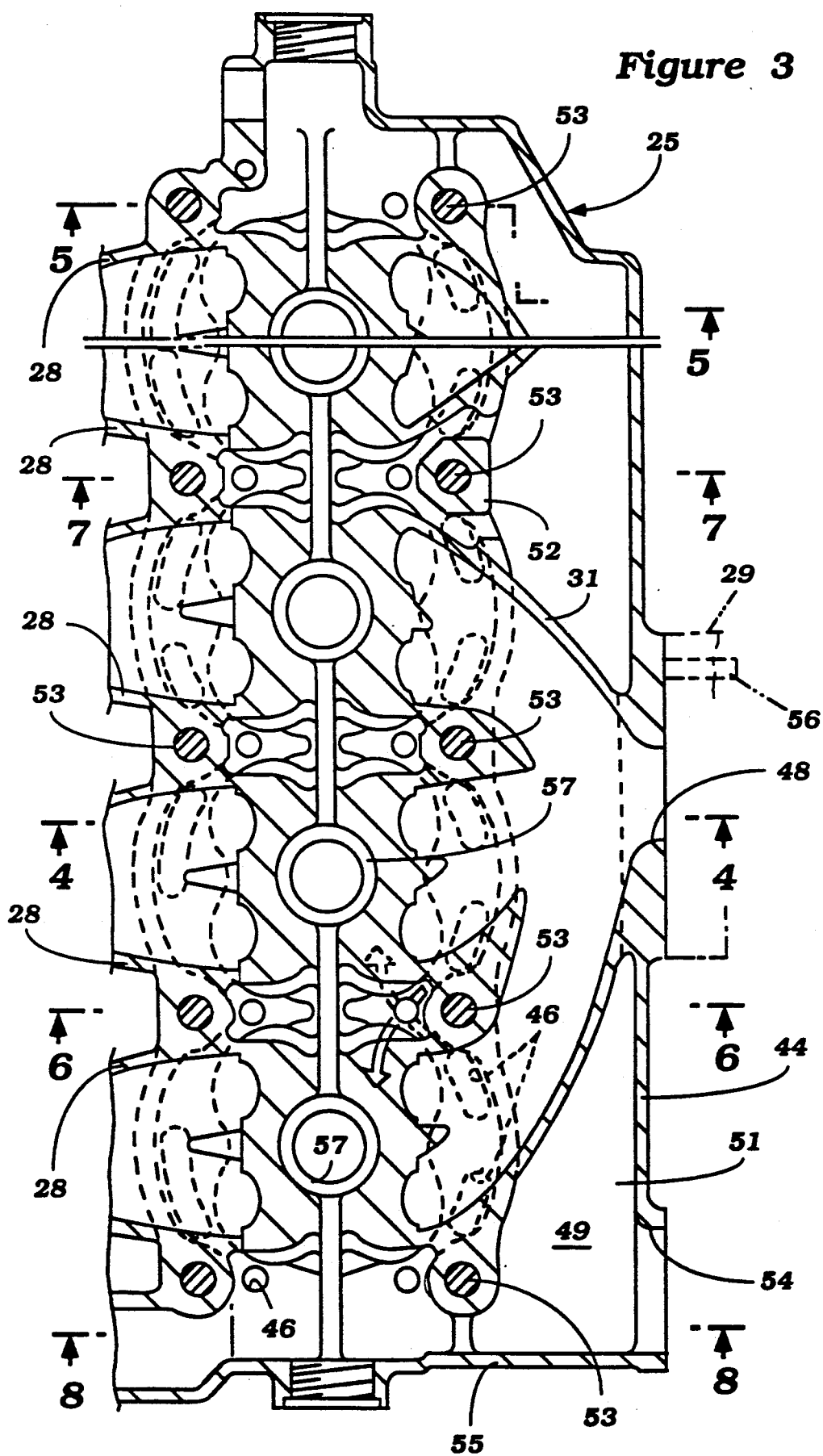
FIG. 3 is a cross-sectional view of the cylinder head of the engine taken generally along the line 3—3 of FIG. 4.
Figure 4:
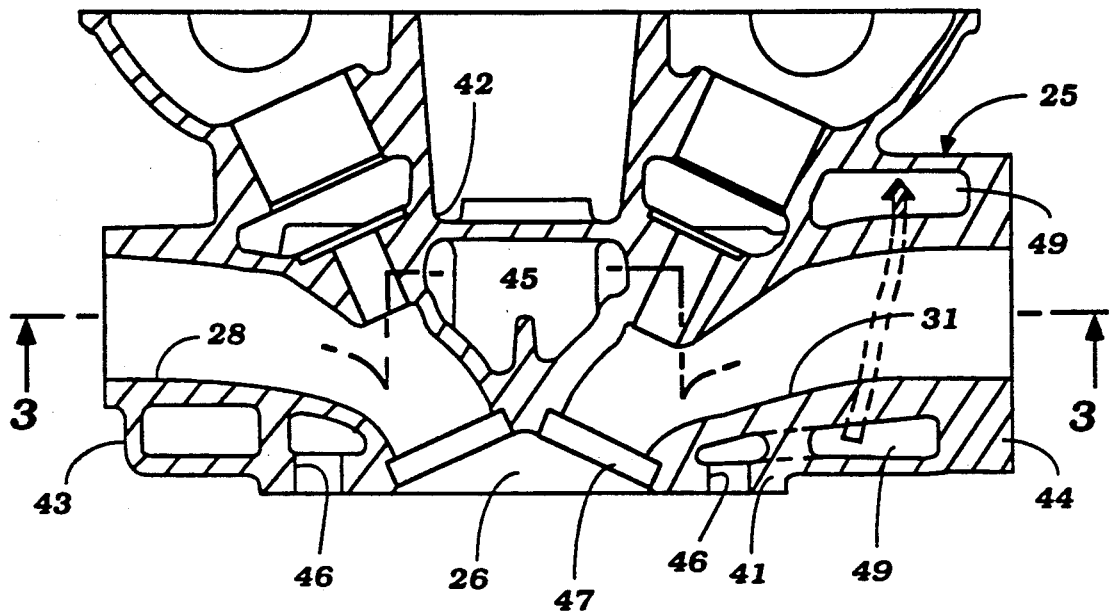
FIG. 4 is a cross-sectional view taken along the line 4—4 of FIG. 3.
Figure 5:
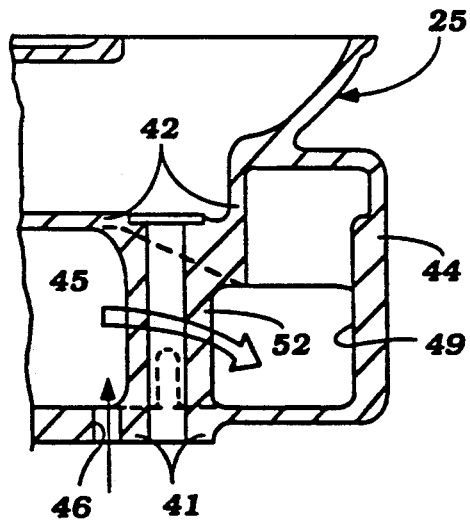
FIG. 5 is a cross-sectional view taken along the line 5—5 of FIG. 3.

Referring first to FIGS. 1 and 2, the invention is depicted in association with a turbo-charged, inline, six cylinder engine indicated generally by the reference numeral 21. Although the invention is described in conjunction with an inline, six cylinder engine, it is to be understood that the invention may be utilized in conjunction with engines having other cylinder numbers or other cylinder configurations. However, the invention has particular utility in connection with engines having two or more cylinders, for a reason which will become apparent. The engine 21 is comprised of a cylinder block 22 in which individual cylinder bores 23 are formed. Pistons 24 reciprocate within the cylinder bores 23 and are connected to a crankshaft (not shown) by connecting rods in a known manner.

Since the invention is directed primarily to the construction of the cylinder head and exhaust manifolding of the engine, as will be described, further details of the basic engine are not believed to be necessary in order to understand the construction and operation of the invention.

A cylinder head, indicated generally by the reference numeral 25, and having a construction as best shown in FIGS. 3 through 9, is affixed to the cylinder block 22 in a manner to be described. The cylinder head 25 is formed with individual recesses 26 that form the combustion chambers of the engine.

An intake manifold 27 is affixed to one side of the cylinder head 25 and has a plurality of intake passages 28 that extend to the individual combustion chambers 26. A charge is delivered to the intake manifold 27 from a charge former (not shown), turbo-charger assembly, indicated generally by the reference numeral 29 and which will be described in more detail, and intercooler.

On the opposite side of the cylinder head 25 from the intake passages 28 there are formed exhaust passages 31 which discharge from the combustion chambers 26 to the turbo-charger assembly 29 in a manner now to be described.

Still referring primarily to FIGS. 1 and 2, the turbo-charger assembly 29 is comprised of a pair of turbo-chargers, each of which has an air inlet portion 32 that receives filtered air from an air intake device (not shown). A compressor stage 33 compresses this air and discharges it to the manifold 27 through a compressor stage outlet 34 and intercooler (not shown). As has been previously noted, a suitable charge former such as a carburetor, carburetors or fuel injection systems may be employed for providing the fuel for the fuel/air charge.

The compressor stages 33 are connected to turbine stages 35 by means of interconnecting shafts 36. The turbine stages 35 are provided with exhaust gas inlet openings 37 that cooperate with the exhaust passages 31 in a manner to be described. The turbine stages 35 have discharge portions 38 that communicate with a common exhaust pipe 39 for discharging the exhaust gases to the atmosphere through a suitable exhaust system.

Referring now primarily to FIGS. 3 through 9, the construction of the cylinder head 25 will be described. The cylinder head 25 is comprised of a casting of cast iron or a light alloy such as aluminum or aluminum alloys. The cylinder head 25 is formed with a lower surface 41 in which the combustion chamber recesses 26 are formed. In addition, the lower surface 41 provides a mating surface for the cylinder block 22. An upper surface 42 is spaced from the lower surface 41 and accommodates an arrangement for supporting the camshafts which operate the valves associated with the intake passages 28 and exhaust passages 31. Since this valve operating mechanism and the valves per se form no part of the invention, illustration and description of them is believed to be unnecessary.

The cylinder head 25 further includes an intake side wall 43 and an exhaust side wall 44. The walls 41, 42, 43 and 44 are all integrally connected to each other but are spaced apart so as to define a cooling jacket and the intake and exhaust passages, as will be described.

The cylinder head cooling jacket includes a main cooling portion 45 that encircles the combustion chambers 26 and intake passages 28. Water is delivered to the chamber portion 45 from the cylinder block cooling jacket through vertically extending water delivery passages 46 that open through the lower wall 41. Of course, the water is circulated through the cooling jacket of the engine and cylinder head by means of a suitable coolant pump (not shown).

It should be noted that the exhaust passages 31 extend from exhaust ports 47 formed in the cylinder head 25 in communication with the combustion chambers 26. In the illustrated embodiment, there are four valves per cylinder and hence there are two exhaust ports 47 for each combustion chamber 26. It is to be understood, of course, that the invention can be utilized in conjunction with engines having other numbers of intake and/or exhaust valves. It should be noted that the exhaust passages 31 are formed in groups so that a number of exhaust passages 31 merge to a common exhaust gas outlet 48 formed in the cylinder head surface 44. In the six cylinder embodiment described, three exhaust passages 31 cooperate with a common exhaust outlet opening 48. The exhaust passages 31 lie substantially in a common horizontal plane and the opening 48 is disposed in alignment with the centermost exhaust passages 31 so that the exhaust passages 31 will all have substantially the same length and this length will be kept as short as possible.

Thus, with this engine of the six cylinder type, there will be two outlet openings 48, each of which cooperates with a respective turbo-charger turbine stage 33. It is to be understood, of course, that other cylinder groupings may be employed. However, it is desirable to provide at least two exhaust passages that cooperate with a common opening 48 and that this opening be positioned approximately midway in the plane in which the exhaust passages 31 are formed so as to achieve the desired results.

Figure 6:
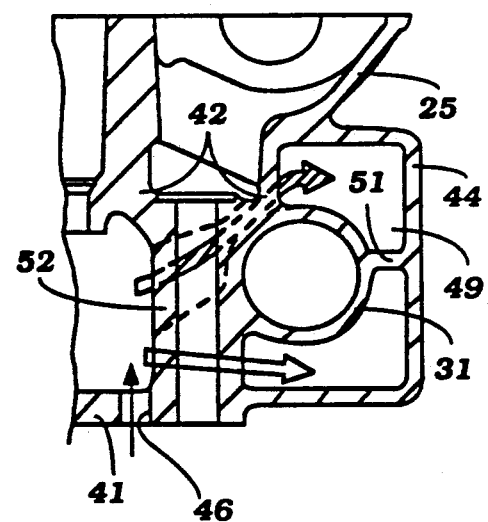
FIG. 6 is a cross-sectional view taken along the line 6—6 of FIG. 3.
Figure 7:
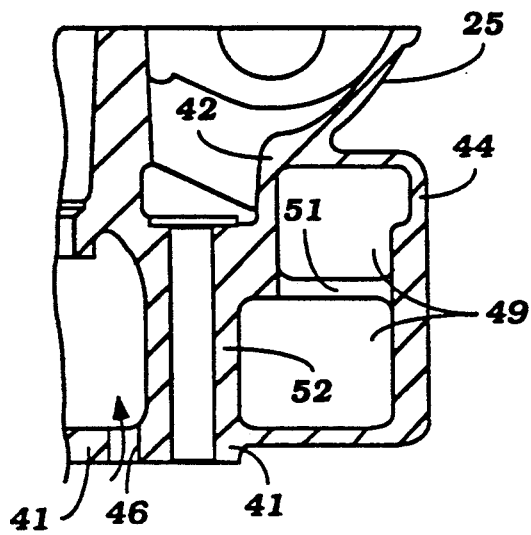
FIG. 7 is a cross-sectional view taken along the line 7—7 of FIG. 3.
Figure 8:
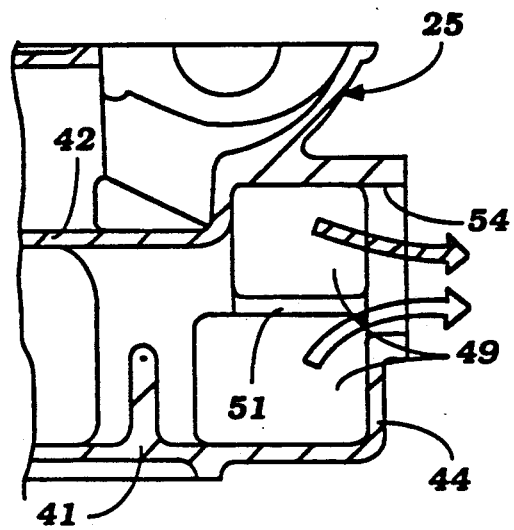
FIG. 8 is a cross-sectional view taken along the line 8—8 of FIG. 3.
Figure 9:
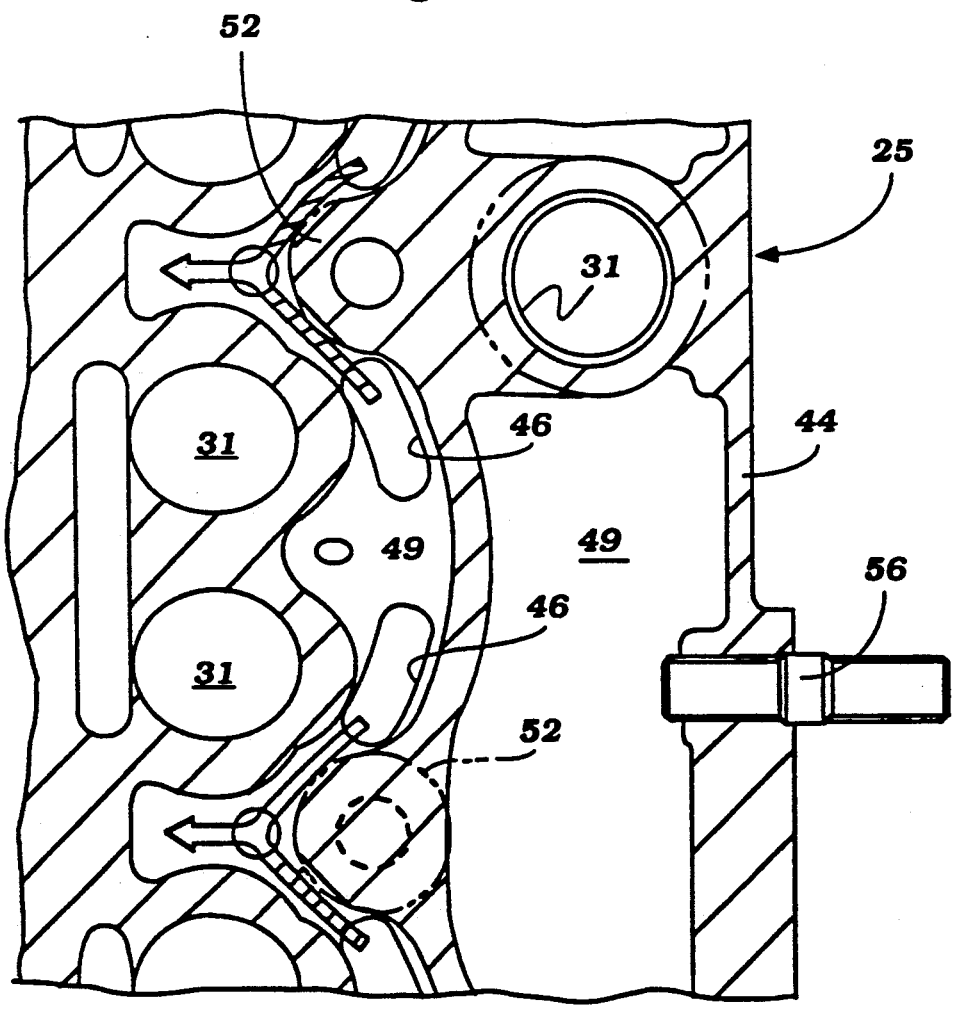
FIG. 9 is a further enlarged cross-sectional view taken through a portion of the cylinder head and shows the details of the cooling system and its relationship to the exhaust ports.

Because of the short length and the fact that the turbo-charger 29 is bolted to the cylinder head, it is important to insure that there is good cooling. To this purpose, there is provided an exhaust passage cooling jacket 49 that is formed within the cylinder head around the exhaust passages 31. The cooling jacket 49 receives coolant from the main cylinder head cooling jacket 43 through paths shown by the arrows in the respective figures. Desirably, the jacket 49 for the exhaust manifold is divided into an upper portion and a lower portion by means of a horizontally extending wall part 51 that extends from the cylinder head outer surface 44 to the remainder of the cylinder head and specifically bosses 52 that form openings for the hold-down studs 53 that hold the cylinder head 25 to the cylinder block 22. The wall 51 is a wall that divides the cooling chamber surrounding the exhaust port into upper and lower portions, as shown in FIGS. 6, 7 and 8. Cooling water is delivered from the cylinder head cooling jackets and specifically the portions to the left thereof, as shown in FIG. 6, in the direction of the arrows. This water can then exit the cylinder head through the exit port described. The purpose of the wall is to divide the two passages so as to control the water flow and also to offer reinforcing for the cylinder head in the area around the exhaust manifold formed therein. The coolant from the exhaust manifold cooling jacket 49 is discharged back to the engine cooling system through a discharge opening 54 formed in the side wall 49 adjacent a forward side wall 55 of the cylinder head 25.

Studs 56 are threaded into the cylinder head 25 around the openings 48 so as to afford means for attachment of the turbo-charger assembly 29.

The cylinder head 25 is also provided with spark plug receiving bosses 57 for receiving spark plugs in a known manner.

EMBODIMENT OF FIGS. 10 AND 11

Figure 10:
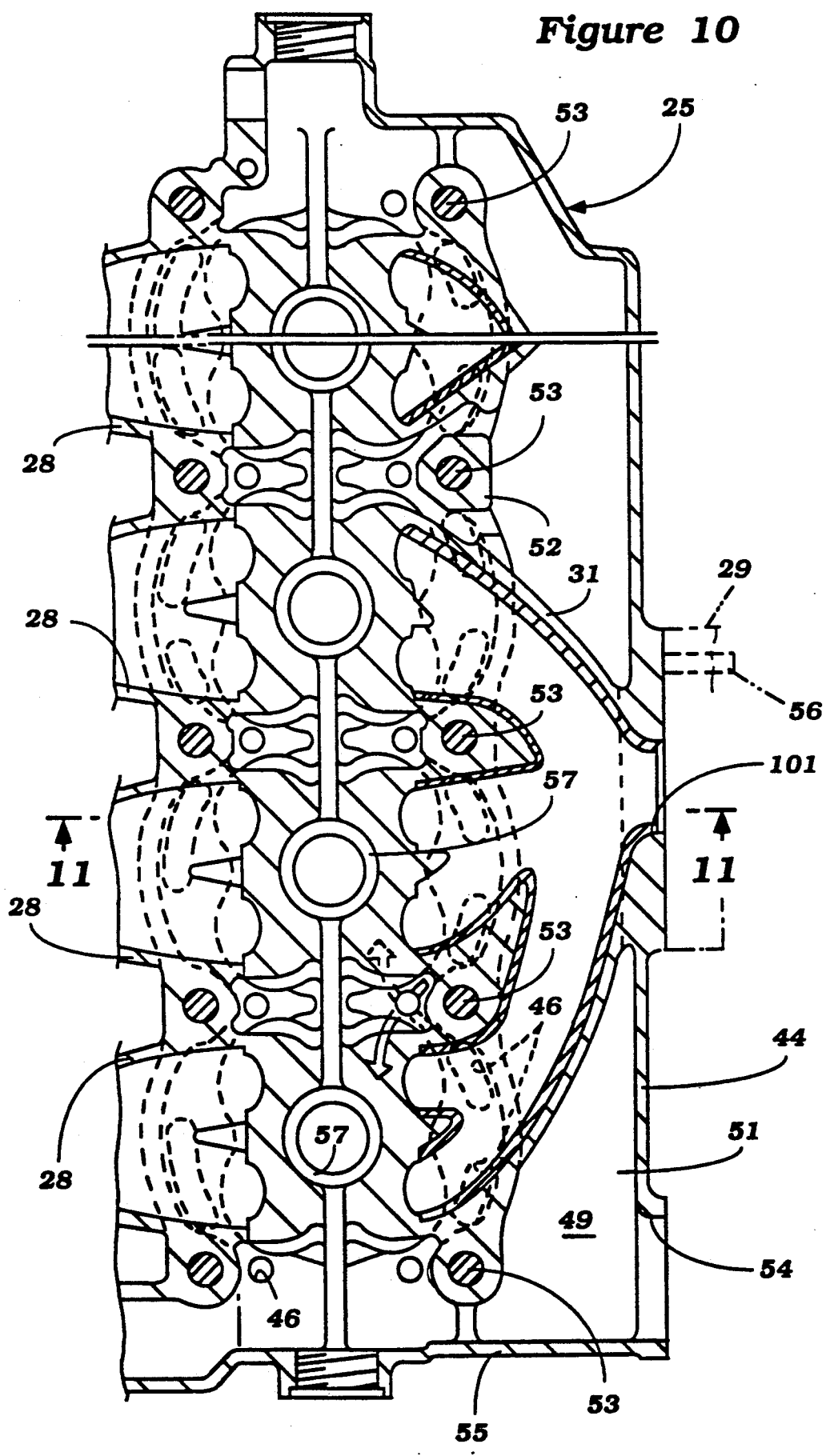
FIG. 10 is a cross-sectional view, in part similar to FIG. 3, showing another embodiment of the invention.
Figure 11:
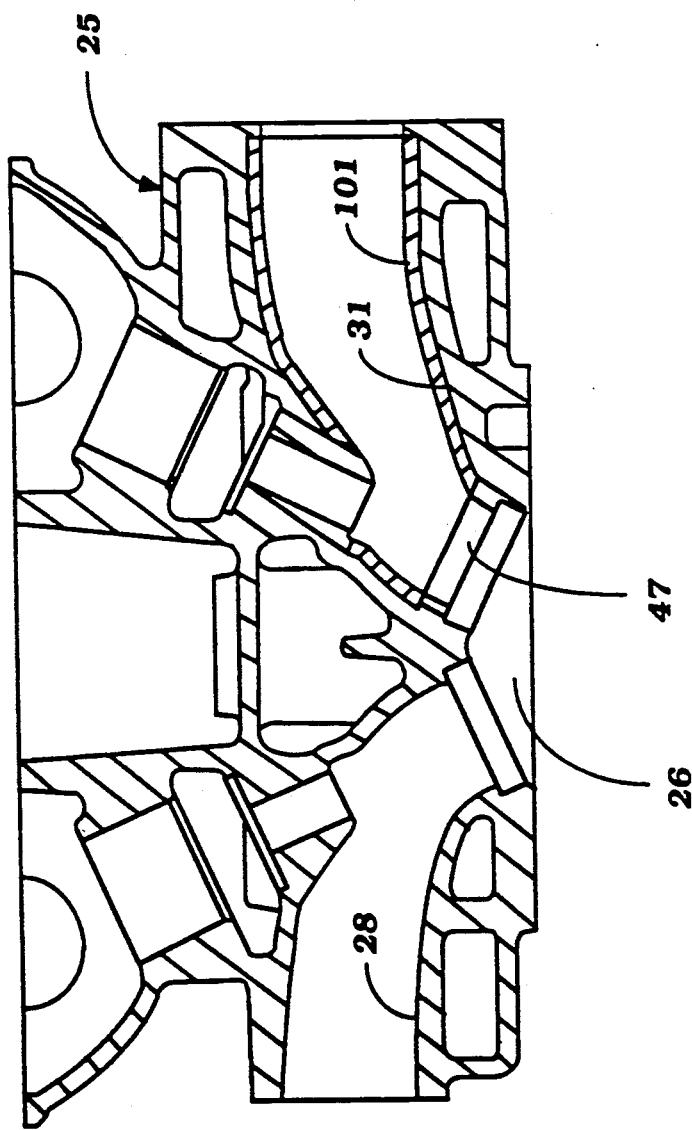
FIG. 11 is a cross-sectional view taken along the line 11—11 of FIG. 10.

It should be apparent that the illustrated embodiment of FIGS. 1 through 9 is effective in providing a very short exhaust passage from multiple cylinders to a turbine stage of an associated turbo-charger, maintaining equal length of the passages and also insuring a good cooling of the cylinder head. It is desirable to insure that the exhaust gases will not be excessively cooled and FIGS. 10 and 11 shows another embodiment of the invention which is generally similar to the embodiment of FIGS. 1 through 9. Because of the similarity of this embodiment to the previously described embodiment, common components have been identified by the same reference numerals and will not be described again. This embodiment differs from the previously described embodiment only in that there are provided port liners 101 that are contained within the cylinder head 25 and which encircle the exhaust manifold passages 31 so as to provide some heat insulation between the exhaust gases and the cylinder head to insure against undue heating of the cylinder head 25 and also against undue cooling of the exhaust gases. In all other regards, this embodiment is the same as the previously described embodiment and, for that reason, further description of this embodiment is not believed to be necessary.

EMBODIMENT OF FIGS. 12 AND 13

Figure 12:
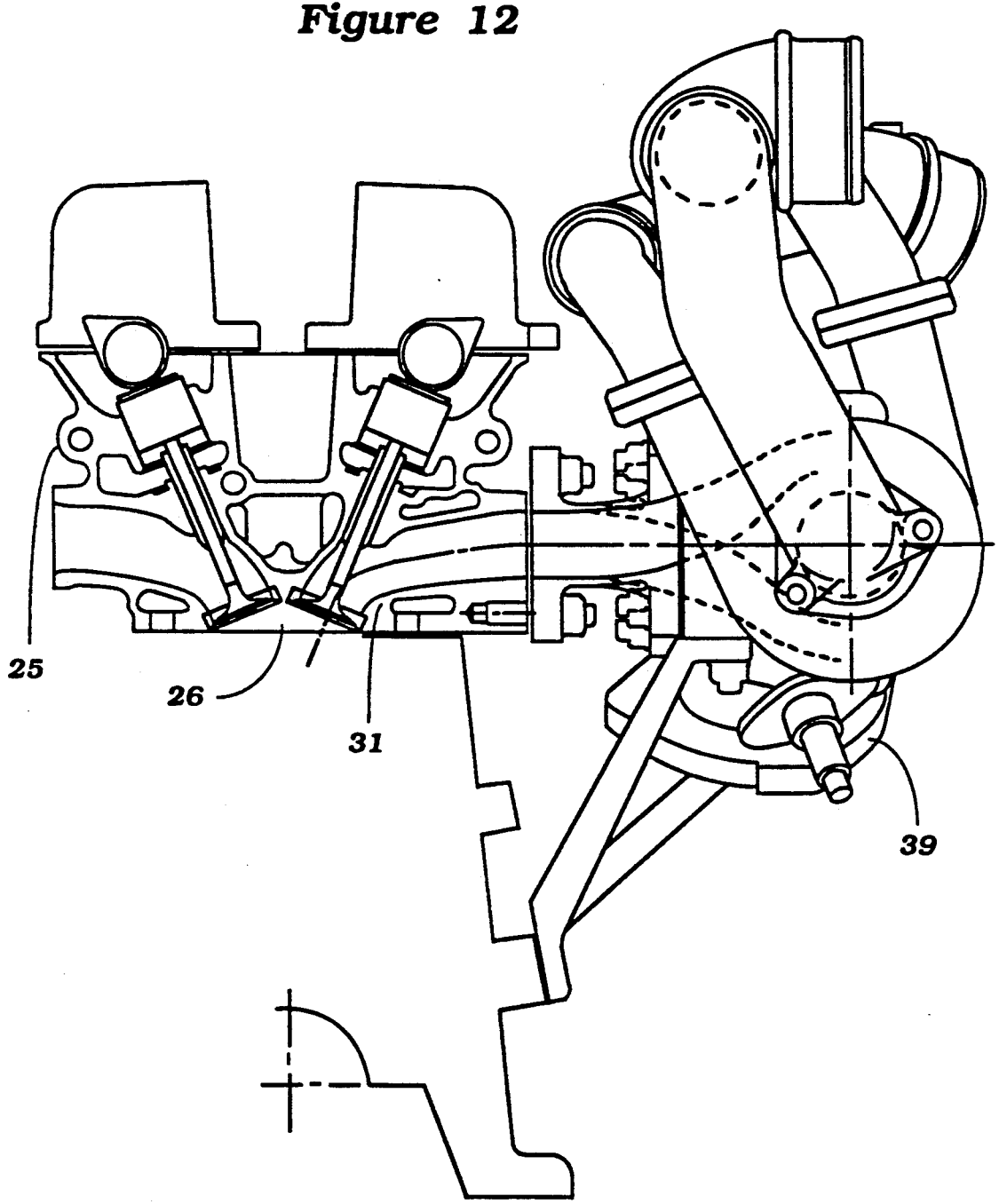
FIG. 12 is a partial side elevational view, with portions shown in section, of another embodiment of the invention.
Figure 13:
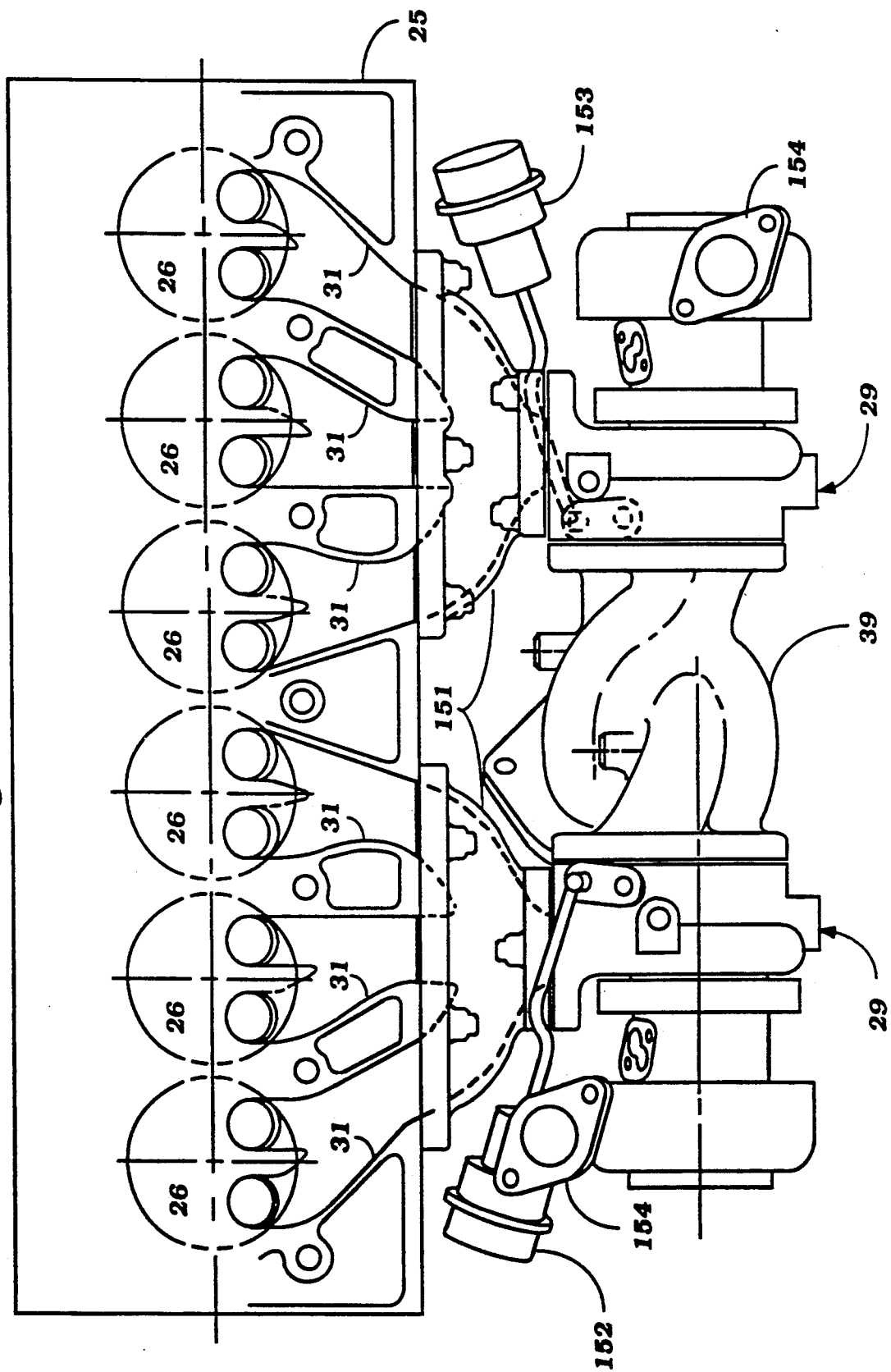
FIG. 13 is a top plan view of this embodiment.

In the constructions as thus far described, a six cylinder engine has been provided with two turbo-charger assemblies, one for each three cylinders of the engine. These turbo-chargers have discharged their exhaust gases to the atmosphere through a common exhaust manifold 39. FIGS. 12 and 13 show an arrangement wherein the construction of the turbo-chargers 29 may be such that each turbo-charger 29 is comprised of identical castings. In addition, in this embodiment, exhaust manifolds 151 are interposed between the cylinder head 25 and the turbo-chargers 29. Rather than having the collector sections formed in the cylinder head, as in the previously described embodiment, the collectors and common outlet are formed in the exhaust manifolds 151.

In this embodiment, the exhaust turbine stages of the turbo-chargers 29 are mounted one inverted relative to the other. This permits a common casting to be utilized for these sections and the turbine bypass valve 152 for one turbine stage will be positioned at the top and the other 153 at the bottom, as shown in FIG. 13, so as to permit a common casting. In addition, the compressor stages are also the same but rather than being inverted, they are reversed one end from the other so that the flanges 154 that communicate the outlets of these stages will be positioned both at the top of the engine so as to discharge to a suitable intercooler (not shown) and then to the intake manifold.

The construction of the two turbo-chargers in this embodiment is such that they are symmetric about the center of the exhaust passage. Because of this arrangement, it is possible to make the diameter of a minimum size since it can be seen that the exhaust passages for one turbo-charger extend upwardly and those for the other turbo-charger extend downwardly from a center plane passing through the center of the exhaust passages. By minimizing the size, this makes a more compact assembly and also reduces turbo lag.

In view of the foregoing description, it is believed readily apparent that a number of embodiments of the invention have been illustrated and described, each of which provides for a very effective turbo-charger arrangement with short exhaust passages but nevertheless equal length. In addition, heat transfer to the cylinder head and engine is substantially reduced. Although a number of embodiments of the invention have been illustrated and described, various changes and modifications may be made without departing form the spirit and scope of the invention, as defined by the appended claims.

We claim:

1. A turbo-charger arrangement for an internal combustion engine having a plurality of combustion chambers defined at least in part by a cylinder head, a plurality of exhaust ports in said cylinder head for discharging exhaust gases from said combustion chambers, a pair of collector sections each comprised of a plurality of exhaust passages each extending substantially in a common plane from a respective one of said exhaust ports to a common exhaust gas outlet lying within said plane, said exhaust gas outlets of said collector sections lying on the same side of said cylinder head and substantially at the midpoint within said plane between the exhaust ports served by the respective collector section for maintaining substantially equal lengths for said exhaust passages and a short length therefor, a pair of turbo-chargers each having a turbine inlet stage in direct communication with a respective one of said exhaust gas outlets, the turbine stages of said turbo-chargers being positioned adjacent each other and the compressor stages of said turbo-chargers being positioned adjacent the respective ends of the engine, and said turbo-charger turbine stages having facing, axially extending exhaust gas discharges, and a common exhaust pipe extending between said exhaust gas discharges for receiving the exhaust gases from each of said exhaust gas discharges and discharging said exhaust gases to the atmosphere through a common outlet.

2. A turbo-charger arrangement as set forth in claim 1 wherein the axes of rotation of the turbine stages of the turbo-chargers are co-axial with each other.

3. A turbo-charger as set forth in claim 2 wherein the turbo-charger turbine stages are symmetrical to each other about their rotational axes.

4. A turbo-charger as set forth in claim 3 wherein the turbine stages of the turbo-chargers each are formed from identical castings.

5. A turbo-charger as set forth in claim 4 wherein the casting of the turbine stage of one of the turbo-chargers is inverted relative to that of the other turbo-charger when mounted on the engine.

6. A turbo-charger arrangement as set forth in claim 2 wherein the compressor stages of the turbo-chargers are formed from identical castings and are reversed one relative to the other when installed.

* * * * *